Jan. 19, 1965  G. T. HEMMETER  3,165,932
ADAPTER FOR WHEEL BALANCER
Filed April 19, 1963
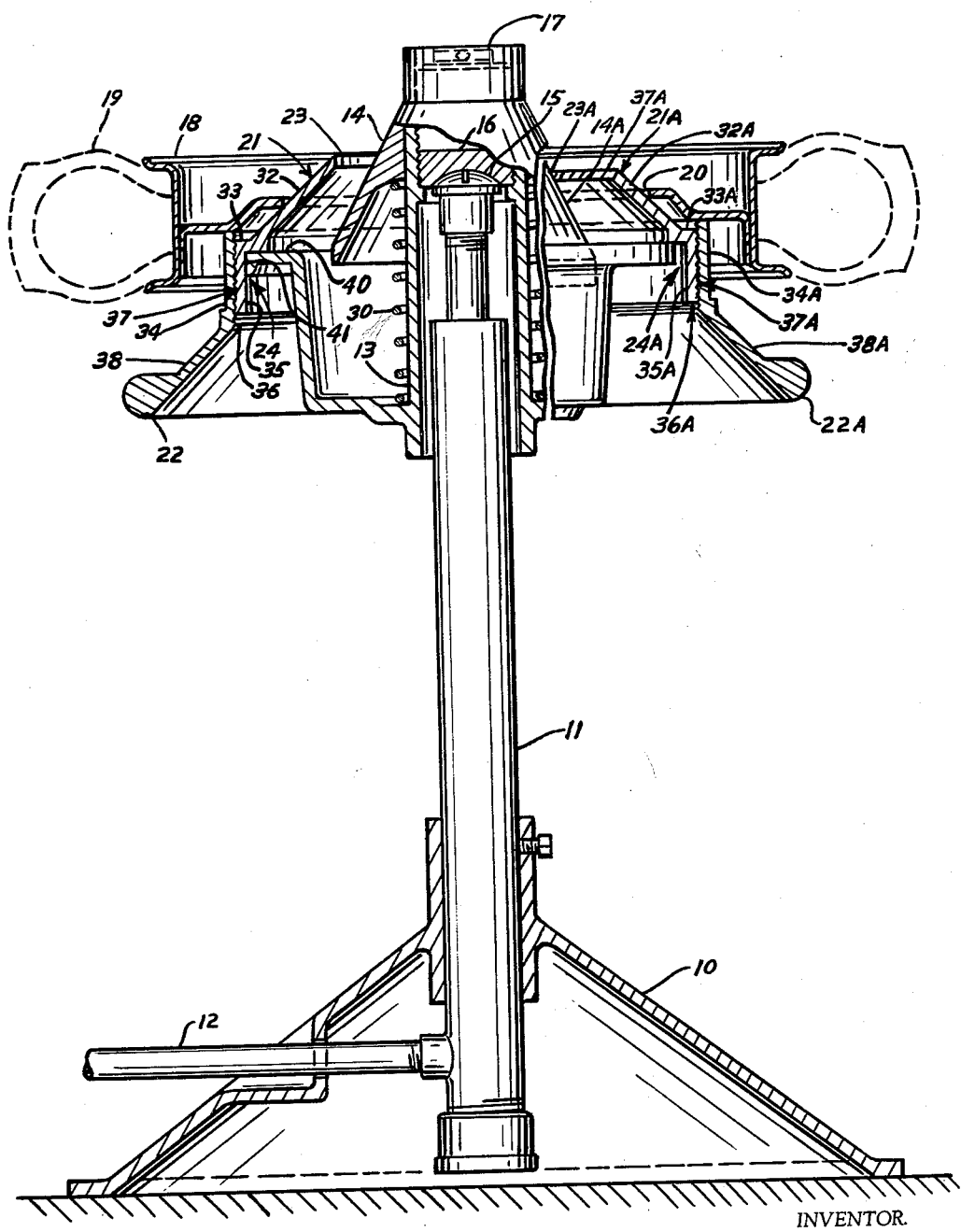
INVENTOR.
GEORGE T. HEMMETER
BY
Carlsen, Carlsen & Sturm
ATTORNEYS

United States Patent Office 3,165,932
Patented Jan. 19, 1965

3,165,932
ADAPTER FOR WHEEL BALANCER
George T. Hemmeter, Mountain View, Calif., assignor to Bishman Manufacturing Company, Osseo, Minn.
Filed Apr. 19, 1963, Ser. No. 274,143
4 Claims. (Cl. 73—484)

The invention relates to static balancing apparatus for balancing wheels and wheel and tire assemblies for automobiles and the like and is more particularly directed to accessories for extending the usefulness of such apparatus.

The present invention may be used with many of the static wheel balancers now in widespread use which embody the general construction shown in my copending application for United States patent, Serial No. 81,422, filed January 9, 1961, now Patent No. 3,152,483, and entitled Wheel Balancer. In the general form of equipment, a wheel receiving mounting apparatus, having a means for centering a wheel thereon and a means for supporting the wheel in a plane normal to a generally vertical plane of the mounting apparatus, is journaled on a substantially frictionless bearing which provides a limited triaxial freedom of motion for the mounting apparatus. A bubble level is positioned on the mounting apparatus and suitable weights are attached to the wheel whereby a balanced wheel will remain stationary in a horizontal plane and the vertical axis of the mounting apparatus will assume a true vertical attitude. The wheel centering means on the mounting apparatus is generally comprised of an inverted cone which is vertically slidably mounted on the mounting apparatus and will accommodate a range of wheel sizes by engaging the center aperture in a wheel and centering the same with respect to the vertical axis of the mounting apparatus before the rim of the wheel engages an annular horizontal supporting and positioning means. It may be appreciated from a consideration of the prior art that the wheel centering cone which is surrounded by the annular positioning ring must flare outwardly at an angle which will provide accurate centering of the wheel and that as a result of this fact, a practical limit of the range of sizes of wheels is soon reached. It is therefore necessary to furnish wheel balancing apparatus for wheels having a wide range of mounting holes and the operators of these machines are required to invest in more than one machine to accommodate the great range of wheel sizes in present use.

In order to increase the range of sizes of wheels that may be accommodated on a wheel balancing machine of the type described above, I have invented a two-piece adapter which may be used in combination with such apparatus. As will be explained in detail below, my adjustable adapter may be supplied in a number of different embodiments to allow satisfactory operation of the various forms of wheel balancing machines with wheels having large center apertures.

It is therefore an object of the present invention to provide an adapter for use with static wheel balancers.

Another object of my invention is to provide an improved two-piece adapter for increasing the range of sizes of wheels that may be accommodated by a wheel balancer.

A further object of my invention is to provide an adjustable adapter for a wheel balancer that may be utilized with many of the wheel balancing machines in present use.

A still further object of my invention is to provide an adjustable adapter for static wheel balancers that is accurate and easily used by an operator.

With these and other objects in mind it will be seen that my invention comprises a wheel centering means having a cone of larger diameter than the wheel mounting apparatus of a wheel balancing machine with which it coacts so that it is positioned coaxially of the wheel mounting apparatus, and a vertically adjustable member at the lower outside periphery. The vertically adjustable member includes an upwardly extending surface that engages a wheel so that the plane of the wheel is normal to the vertical axis of the wheel mounting apparatus. The wheel balancing machine may then be operated in the usual manner as described in my copending application.

These and other more detailed and specific objects will be disclosed in the course of the following specification, reference being had to the accompanying drawing, in which the single figure is a composite drawing of two embodiments of my invention.

Referring now to the drawing, there is shown a prior art static wheel balancing machine having an inverted conical base member 10, an upright tube member 11 mounted therein and wheel mounting apparatus journaled on a spherical bearing member 15 on the top end of tube member 11. Bearing 15 may be a pivotal bearing, or a fluid lubricated bearing supplied with fluid lubricant, such as air under pressure through tube 11 and conduit 12 connected to a suitable source of fluid (not shown).

The wheel mounting apparatus includes a generally vertically extending member 13 which is provided with a center tube and a concentric, radially displaced axially extending outer portion. The center tube extends axially upwardly from the bottom of member 13 and carries a spherical bearing member 16 that is complementary in shape to bearing member 15 on the top end of upright tube 11. A bubble level indicator 17 is mounted on the top of the center tube and is mounted thereon to indicate to an operator the attitude of the vertical axis of member 13 with respect to a true vertical line. The top of the upwardly extending outer portion is constructed so that a plane, normal to the vertical axis, is defined thereby. A conical wheel centering member 14 is slidably journaled on the outside of the center tube and a compression spring 30, responsive to the weight of a tire and wheel, is positioned between the lower end thereof and the bottom of member 13 to supply an upward biasing force on centering member 14. It should be noted that conical wheel centering member 14 has a maximum radial dimension which is less than the radial dimension of the inside of the outer portion of member 13 and in operation will be free to move downwardly inside of member 13.

It will be seen that the right and left-hand sides of the drawing represent two embodiments of my invention. On the upper right-hand side of the drawing the two members of which my invention is comprised are indicated generally by reference characters 21A and 22A respectively. Member 21A has a central aperture 23A having an outwardly flaring edge which is adapted to coact with conical wheel centering means 14A shown displaced slightly downward on a static wheel balancer, a radially extending portion 31A, a first depending conical downward radially flaring portion 32A for engaging the center aperture 20 of a wheel, a second radially extending portion 33A having an inside downwardly facing annular surface that is in a plane normal to the longitudinal axis and a downwardly depending axially extending portion 35A including means 36A (for example screw threads) for axially adjustably engaging and receiving and positioning member 22A. Member 22A includes a like axially extending portion 34A including threaded means 37A for coacting with the above noted adjusting means 36A on member 21A and a downwardly depending radially outwardly extending portion 38A serving as a handwheel for engagement by an operator for effecting relative axial displacement of member 22A with respect to member 21A. The top end of portion 34A on member 22A serves to define a plane that is positioned normal to the vertical or longitudinal axis of members 21A and 22A. A nominal amount of clearance between the second radially extending portion 33A of member 21A and the outside periphery of the top end of the outer portion of member 13 is indicated by the reference character 24A.

It should be noted that the adjusting means 36A and 37A, which provide for relative axial displacement between members 21A and 22A, is such as to maintain the downwardly facing surface on the second radially extending portion 33A on member 21A in parallelism with the upwardly facing surface on the axially extending portion 34A on member 22A. It may also be noted from the drawing that the downwardly facing surface on the second radially extending portion 33A of member 21A is in contact with the top of the upwardly extending outer portion 40 of member 13 so that coincidence of the vertical axis of member 13 and the longitudinal axes of members 21A and 22A and parallelism of the planes normal to the respective axes is easily and readily achieved and maintained and members 21A and 22A are concentric with member 13.

In the embodiment shown in the upper left-hand side of the drawing members 21 and 22 correspond generally to members 21A and 22A. Member 21 has a central aperture 23, which is of a radial dimension so that it does not contact the wheel centering means 14 on the wheel balancer, a downwardly extending radially flaring portion 32, a depending radially extending portion 33 having a downwardly facing surface in a plane normal to the longitudinal axis of member 21 and an axially extending dependent portion 35 having means 37 for adjustably engaging and receiving member 22 and an annular inside surface 41 having an axis concentric with the axis of member 21. Member 22 is the same as member 22A.

It will be seen that the downwardly facing surface on the radially extending portion 33 is in contact with the upwardly extending outer portion of member 13 and the concentric inside surface 41 of the axially extending portion 35 is in engagement, as indicated by reference character 24, with an annular concentric outer surface of the top end of the outer portion of member 13 to maintain members 21 and 22 in correct concentric and planar engagement with the wheel mounting apparatus described above.

In operation of the embodiment shown on the right side of the drawing, member 22A is retracted axially of member 21A so that the top of portion 34A is below portion 33A and the adapter assembly is positioned on the wheel balancing apparatus so that the flared edges of circular aperture 23A engages wheel centering member 14A. A wheel and tire assembly is then positioned on top of the adapter assembly and the circular aperture 20 in wheel 18 engages conical portion 32A. The weight of the adapter and/or wheel and tire assembly is generally sufficient to overcome the upward biasing force of spring 30 and member 14A moves downwardly until the downwardly facing surface on radially extending portion 33A engages the upwardly extending surface 40 on member 13. At this time the axes of member 21A and 22A are concentric with the axis of member 13 and the planes defined by the downward facing surface on portion 33A and the upward facing surface on portion 34A are normal to the axis of member 13. The wheel and tire assembly are restrained from rotation by the operator and member 22A is then moved axially upwardly into engagement with wheel aperture 20 by rotating it in the proper direction. As the top surface of portion 34A on member 22A engages wheel 18, aperture 20 assumes a concentric position on conical portion 32A on member 21A and further engagement positions wheel 18 in a plane normal to the axis of member 13. After this attitude has been reached further rotation of member 22A will not result in upward axial movement with respect to member 21A due to the tendency for member 21A to rotate along with the entire top portion of the wheel balancing apparatus. It is therefore an easy matter for the operator to sense that the wheel balancing apparatus is ready for the usual balancing operation.

The operation of the embodiment at the left side of the drawing is similar to that described above in that retraction of member 22 is performed before a wheel is placed on the adapter and that the entire top portion of the wheel balancing apparatus and the adapter assembly will rotate when the wheel is in proper position for the usual balancing operation. It may be noted that wheel centering member 14 remains in its uppermost position and is not used for the purpose of maintaining concentricity of the axes of members 13, 21 and 22. Conical portion 32 on member 21 is concentric with member 13 due to the engagement, at 24, of the inside annular surface 41 on member 21 and the outside annular surface on the top outside portion of member 13. In other respects the operation is the same and it may now be appreciated that my invention is useful with many different forms of static wheel balancing equipment.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. In combination with apparatus of the class above described, a two part adapter for large apertured wheels comprised of a first member having a radially, downwardly flaring wheel centering portion, a downwardly depending portion adapted to adjustably engage a second member, a surface in a plane normal to the longitudinal axis thereof and a further annular surface adapted to engage a wheel mounting so that the axes thereof are coincident, a second member having an upwardly extending, planar wheel engaging portion, and means axially, adjustably interconnecting said first and second members, said means being adapted to maintain the plane of said wheel engaging surface parallel to the plane surface on said first member.

2. The apparatus of claim 1 in which the means adjustably connecting the two members is comprised of coacting screw threads on the outside of the first member and on the inside of the second member.

3. The apparatus of claim 1 in which the annular surface on the first member is adapted to engage an axially slidable wheel centering device on the wheel mounting.

4. The apparatus of claim 1 in which the annular surface is adapted to engage the radial periphery of a wheel supporting planar surface on the wheel mounting.

References Cited by the Examiner
UNITED STATES PATENTS 2,631,452  3/53  Hutter _____ 73—484
2,720,110  10/55  Lucht _____ 73—484

FOREIGN PATENTS 11,350  1914  Great Britain.

RICHARD C. QUEISSER, *Primary Examiner.*
JAMES J. GILL, *Examiner.*